(12) United States Patent
Ehrlich (10) Patent No.: US 9,312,905 B2
(45) Date of Patent: Apr. 12, 2016

(54) MOBILE ELECTRONIC DEVICE CASE AND WALLET

(71) Applicant: Jake Ehrlich, San Francisco, CA (US)

(72) Inventor: Jake Ehrlich, San Francisco, CA (US)

( * ) Notice: Subject to any disclaimer, the term of this patent is extended or adjusted under 35 U.S.C. 154(b) by 0 days.

(21) Appl. No.: 14/081,087

(22) Filed: Nov. 15, 2013

(65) Prior Publication Data

US 2015/0141082 A1    May 21, 2015

(51) Int. Cl.
| | |
|---|---|
| *H04M 1/00* | (2006.01) |
| *H04B 1/3888* | (2015.01) |
| *H04M 1/04* | (2006.01) |
| *H04M 1/21* | (2006.01) |

(52) U.S. Cl.
CPC .............. *H04B 1/3888* (2013.01); *H04M 1/04* (2013.01); *H04M 1/21* (2013.01)

(58) Field of Classification Search
CPC ........... H04B 1/3888; A45C 2011/002; A45C 2011/003; A45C 13/002; A45C 2011/001; H04M 1/0202; H04M 1/0214; H04M 1/0216; G06F 1/1626; G06F 1/1632; G06F 2200/1633; G06F 1/1628; G06F 1/1613; G06F 1/16

USPC ....................................................... 455/575.1
See application file for complete search history.

(56) References Cited

U.S. PATENT DOCUMENTS

| | | | |
|---|---|---|---|
| 2010/0200456 A1* | 8/2010 | Parkinson ..................... | 206/701 |
| 2014/0152890 A1* | 6/2014 | Rayner ......................... | 348/376 |

* cited by examiner

*Primary Examiner* — Kwasi Karikari
(74) *Attorney, Agent, or Firm* — David Olsen (57) ABSTRACT

A mobile device and wallet case having a continuous inelastic frame conforming to the shape of a mobile device and having one or more apertures. The frame includes a foot on one side to assist in the insertion of the mobile device. The case can include transverse structures integrally formed with the frame and configured to attach a hollow-core door sized for storage. When open, the door functions as a stand for a mobile device in both the vertical position and horizontal position and bosses provide resistance to the door opening. The door can include a thumb slider aperture. The case can include a latch comprised of a frame coupled protuberance and a tooth having a female receiving recess configured to receive the protuberance. The frame inside and top edge of the frame is lined with an elastomeric liner that can extend through the button apertures.

18 Claims, 7 Drawing Sheets

MOBILE ELECTRONIC DEVICE CASE AND WALLET

CROSS REFERENCE TO OTHER APPLICATIONS

This application claims priority under 35 U.S.C. §119(e) of the U.S. provisional patent application Ser. No. 61/727,148 filed on Nov. 16, 2012 entitled "Mobile Device Case Apparatus." The provisional patent application Ser. No. 61/727,148 filed on Nov. 16, 2012 entitled "Mobile Device Case Apparatus" is hereby incorporated by reference. Additionally, the design patent application Ser. No. 29/437,545 filed on Nov. 18, 2012 for mobile device case is hereby incorporated by reference.

FIELD OF INVENTION

The present invention relates to cases that function as both a wallet and a mobile device case. Prior art cases have not effectively and ergonomically functioned as both a wallet and a case. Prior art cases are built with bulky compartments, extra layers that are heavier, thicker, and thus have reduced ergonomics. Further, prior art mobile device cases are not built with a continuous and inelastic frame that also provides easy mobile device insertion. To provide needed structural rigidity for cases with storage compartments, prior art cases are built with a closed rigid back. This results in a thicker case or less storage capacity. Additionally, for the mobile device to be inserted and removed, the case needs to be either flexible, loosely fitting, or a combination thereof. As a result, prior art cases are not found being both tight fitting and having a continuous inelastic outer frame. Gaps and cutouts in the frame are provided so that the frame is outwardly flexible for the insertion of a mobile device.

What is needed is a case that provides a protective mobile device case and functions as a complete wallet replacement that can store credit cards, business cards, cash, coins and keys. Further, what is needed is a case that hides the storage compartment door and prevents unwanted attention of people that are interested in stealing both a phone and a wallet in one grab.

BRIEF DESCRIPTION OF THE DRAWINGS

In order that the advantages of the invention will be readily understood, a more detailed description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

FIG. 6B—A sectional view through the door and the tooth.

FIG. 6C—A sectional view of the frame through the cleat.

FIG. 7B—A side view of the case in landscape mode.

SUMMARY OF THE INVENTION

The invention embodies mobile device cases that are also a wallet replacement. The case uniquely and not expectantly includes a hollow-core door for containing items that are traditionally held in a wallet. These items can include but are not limited to money, credit cards, and keys. The hollow-core door, when open, also functions as a stand for holding a mobile device in both landscape and portrait positions. When the hollow-core door is closed, the case is configured to hide any indications that it stowing valuables. This includes a case that when closed has hidden hinges, hidden latches, and is thin enough that one would not suspect there is a door with up to five credit cards and a hidden compartment for holding money.

One of the problems overcome by this invention is creating a case that is both thin but has the structural integrity for attaching a hollow-core door. This problem was overcome by forming a chassis comprising a unique continuous non-elastic frame in conjunction with top and bottom transverse structures. The ridged chassis design eliminates the need for a layer between the mobile device and the hollow-core door. Further, the design provides for a case with an open back which allows for a tighter fitting case. Mobile device removal from a rigid frame is difficult or damaging without the ability to push on the back of the mobile device during removal. Access to the back side of the mobile device is provided by the disclosed invention.

An additional problem solved by this invention is the mobile device insertion into a ridge frame with a tightly fitting liner. A foot added to the frame allows for insertion without binding to the liner and pulling the liner away from the case.

DETAILED DESCRIPTION OF THE INVENTION

Generally, wallet cases are designed to fit a specific device make and model. Exemplar of mobile devices which can use wallet cases include mobile smart phones, portable audio and video players, Global Positioning System navigation devices, personal digital assistants, electronic book readers, cameras, small tablet computers, tablet phones, and portable video game players. However, the wallet case could be applied to any mobile device.

The below-described embodiments of the present application are intended to be examples only. Alterations, modifications and variations may be effected to the particular embodiments by those skilled in the art without departing from the scope of the application, which is defined by the claims appended hereto.

Figure 1:
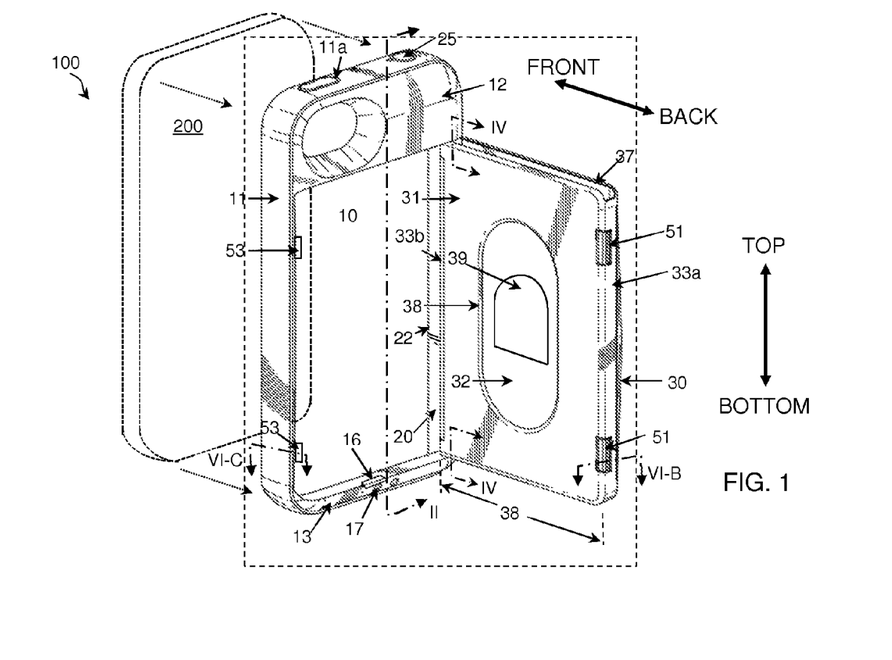
FIG. 1—A rear perspective view of the case with the hollow-core door open.

Referring to FIG. 1, an exemplar mobile device wallet case 100 embodiment is shown and described. Hereinafter, the mobile device wallet case 100 may be referred to as the mobile device case 100 or the case 100.

The mobile device case 100 is comprised of a chassis 10, an elastomeric chassis liner 20, and a hollow-core door 30. The case 100 provides protection from scratches and excessive shock to a mobile device 200 while also providing the features of a wallet. These wallet features include closeable and hidden compartments for items including but not limited to credit cards, business cards, keys, and money.

The chassis 10 includes a continuous frame 11 that circumscribes the mobile device 200 outer edges. The frame 11 defines a receiving area for the mobile device 200. The chassis 10 can include a top transverse structure 12 and a bottom transverse structure 13. The transverse structures 12, 13 can include storage compartments 14, 15, and lanyard attachment points 17. Further, the chassis 10 can include a foot 16 that prevents liner 20 binding and distortions during mobile device 200 insertions. Also, the foot 16 can be configured as part of a quick disconnect system FIG. 8-70 with two counter sinks.

The chassis 10 is preferably is a continuous inelastic structure with integrally formed frame 11 and transverse structures 12, 13. An integrally formed chassis 10 includes a unibody chassis 10 that is formed as one piece, is seamless, and does not include the coupling of one or more pieces to form the chassis 10. In case 100 embodiments with a hollow-core door, the transverse structures 12, 13 provide chassis 10 rigidity and hollow-core door 30 attachment points. Further, the frame 11 upper and lower traverse structures 12, 13 are esthetically pleasing, scratch resistant, are readily manufactured in materials in different colors, and are paintable.

Uniquely, the continuous inelastic frame 11 is not found in prior art case designs. The frame 11, being a continuous structure, is distinguished from prior art case designs by being continuous and substantially inflexible at the corners. Thus, the case 100 uniquely does not rely or require it to be substantially bent or flexed at the corners during insertion or removal of a mobile device 200. Prior art cases have breaks, gaps, or a non-continuous frame structure to enable the frame to bend outward during mobile device insertion. Often a gap in the prior art frame will be filled with elastomeric material to provide the appearance of a continuous frame. Continuous inelastic prior art fames are not found because insertion of the mobile device into a tightly fitting frame will bind against an elastomeric liner and rip it away from the frame.

Further the frame 11 is configured in combination with the liner 20 to provide a uniquely tight fit around the mobile device 200. The frame 11 or the frame 11 with the transverse structures 12, 13 define a receiving area that is substantially open therethough. This opening is required for a case 100 having a tightly conforming inelastic frame 11. Without access to the back of a mobile device it would be very difficult to remove it without damaging the case 100 or mobile device 200. Removal requires pushing down on the back of the mobile device 200 while pulling back on the frame 11 or chassis 10. Cases with a closed back would lack access to push the mobile device out of the front of the frame. To overcome this insertion and removal problem, the chassis 10 includes a foot structure 16 in conjunction with the continuous inelastic frame 11.

The frame 11 is preferably integrally formed with the chassis 10. Preferably the chassis 10 includes the top and bottom traverse structures 12, 13, foot 16 and frame 11, is formed from a hard inelastic plastic. Exemplar plastics are polycarbonate or ABS (Acrylonitrile Butadiene Styrene), a hard plastic that does not stretch or bend or distort easily. A further advantage of a chassis 10 formed from hard inelastic plastic is that the material is suitable for incorporating door hinges 40 and latch structures 50. Hinge pins are more readily seated into and rotate without wear against a hard plastic. Further, the use of an elastomeric plastic or other soft material for a frame or chassis would result in a structure that would more readily twist, spring the door hinges, and likely release the door latches.

A further advantage of a rigid frame 11 with integrally formed transverse structures 12, 13 is the structural rigidity provided without requiring an additional layer of material on the back of the case. Other prior art cases incorporate a chassis with a back layer for providing structural rigidity, integrity, and attachment points for a door. This back layer of material forms an addition layer between the mobile device and any storage compartment and thereby increases the case thickness. Further, the extra back layer can reduce the case ergonomics and potentially alert others to the presence of stored valuables. The theft of smart phones is already a problem but a phone with stored credit cards is an additionally attractive target.

The frame 11 can include apertures 11 a. These apertures 11 a can be for user access to mobile device 200 power connectors, data connectors, headset jack, speaker phone sound ports, mute switch, power switches, and volume switches. Further, these frame apertures 11 a can include structures 25a, 25b that communicate external forces to a mobile device's buttons and switches. These structures 25a, 25b can provide easy access to the mobile device's buttons, ergonomic feedback on the button type (up volume versus down volume), and a water and dust resistant barrier. Exemplar of these structures is elastomeric material, formed though an aperture 11a, that can be an integral part of the liner 20.

The top or bottom transverse structures 12, 13 can include hidden storage areas. These storage areas are preferably a cavity 14, 15 integrally formed into the traverse structures 12, 13. The top and bottom cavities 14, 15 provide storage areas hidden behind the mobile device 200 and are not externally visible. The storage cavity 14 can store items such as money, medicine, precious jewels, an electronic FOB for activating another device including but not limited to an automobile auto lock, home lock, key access system, or a combination thereof. Preferable the cavity 14 takes up as much of the top traverse structure as possible and has a depth of between 0.185 inches and 0.205 inches. Preferably, the traverse structures 12, 13 are flush with the backside of the closed hollow-core door 30 and the top traverse structure 12 completely covers the door aperture 37. A preferable case 100 embodiment has a smooth and level transition between the transverse structures 12, 13 and the door 30, and thereby further hiding the door's 30 presence.

In some case 100 embodiments, the bottom transverse structure 13 or frame 11 can have a lanyard 60 attached. In one embodiment, the bottom transverse structure 13 includes one or more apertures 17 for looping and securing a lanyard 60.

The top and bottom transverse structures 12, 13 can include hinge structures 40 for coupling the hollow-core door 30 to the chassis 10. Preferably the hinge structures include recesses or holes in the traverse structures 12, 13 and the door 30 is configured to receive hinge pins. Preferably the hinge structure 40 is hidden and does not reveal that there is storage compartment within the case 100.

Liner

Figure 2:
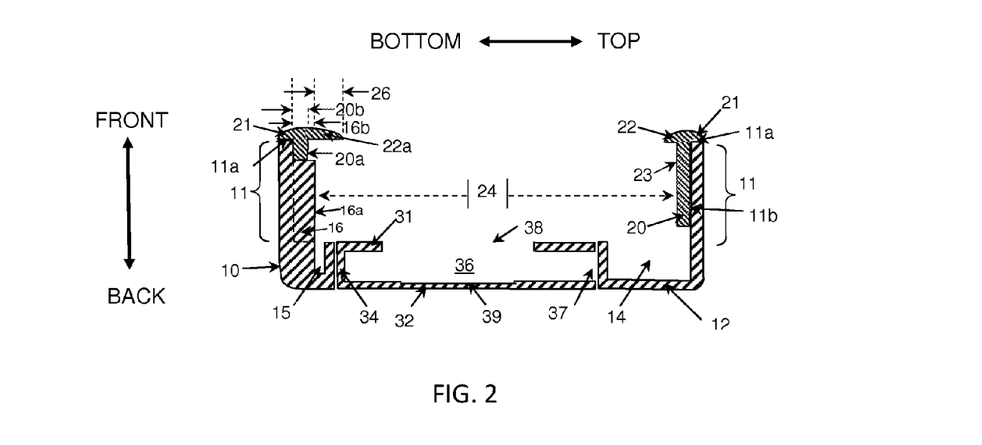
FIG. 2—A sectional view of the case.
Figure 3:
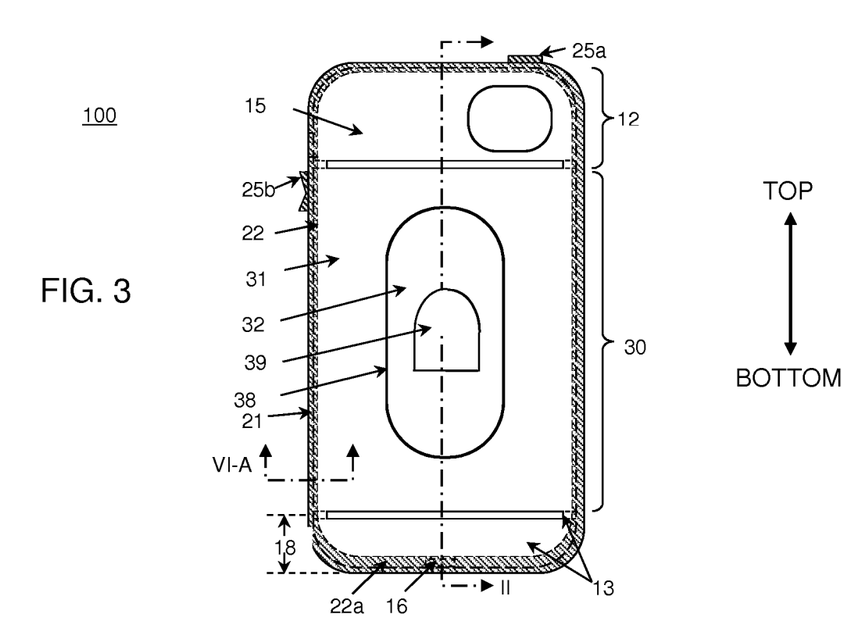
FIG. 3—A front interior view of the case without mobile device installed.

The liner 20 is preferably formed from a shock absorbent elastomeric material coupled to the frame inside surface 11b. Referring to FIG. 2, in some embodiments the liner 20 extends above the front plane of the frame 11 and forms an outside lip 21 and an inside lip 22, 22a. Preferably the liner 20 on the frame inside 11b has sufficient thickness to absorb the shock of a case 100 dropped from six feet without damage to an enclosed mobile device 200.

A liner thickness 20b is between 50 and 200 thousandths of an inch. A greater liner thickness 20b would only increase the size of the case 100 without adding needed protection. However, a liner 20 with varying thickness along the frame 11 sides is contemplated.

The outside lip 21 covers and is bonded to the top frame edge 11a. The inside lip 22, 22a extends inward towards the center of the receiving area for the mobile device 200. The inner lip 22 functions to secure the mobile device 200 in the chassis 10 and can provide moisture and dust protection.

Referring to FIG. 2, the bottom inner lip 22a can extend further into the receiving area than the upper or side lips 22. Further, the liner 20 can extend through frame apertures 11a and thereby form a coupling mechanism 25a, 25b for communicating external forces between the outside of the chassis 10 and buttons or switches along the mobile device 200 outer periphery. Additionally, the liner inside edges 11b can include recesses and indentations in areas corresponding with the mobile device 200 buttons. These indentations allow a tight fit between the liner 20 and the mobile device 200 while preventing the buttons from being asserted by the tightly fitting frame 11 and liner 20.

The liner 20 is preferably made from TPE (Thermoplastic Elastomer) or TPU (Thermoplastic PolyUrethane) material and preferably is formed by an over-molding plastic injection process. The over-molding process is performed in conjunction with the process of forming the chassis. This process couples the frame 11, preferably a hard polycarbonate plastic or ABS, to the liner 20 by a chemical bond that is formed during the over-molding injection process. Alternatively, the liner 20 can be formed separately from the chassis 10 and inserted and glued to the frame 11 in a separate step.

Case Design

The case 100 when configured with a continuous inelastic frame 11 includes several inventive structural features to enable the insertion and removal of a mobile device 200 without damaging the liner 20, chassis 10, or mobile device 200. These structural features prevent binding between mobile device 200 and the liner 20 during insertion and removal. Binding can result in the liner 20 being pulled away from the frame 11, forced under the mobile device 200, and potentially damaging the liner 20. These structural features include a low friction foot 16 and a limited width inside liner lip 22a.

The first structural feature is a foot 16 located along the inside of the frame 11. The liner 20 is configured to not overlie the foot face 16a. The foot 16 protrudes transversely from the frame 11 a distance 16b that is greater than the liner thickness 20b. Thus, the foot 16 provides a low friction surface for the mobile device 200 to slide along during insertion. Preferably, there is only one foot 16 and it is centered at the bottom of the frame 11. However, in alternative embodiments the foot 16 can be located on any side of the frame. Preferably, the foot 16 is formed as an integral chassis 10 part. However, the use of a non-integral foot 16 is contemplated. The foot 16 can be formed out of materials different from the chassis 10 and coupled to the chassis 10 by conventional means including but not limited to glue, screws, mechanical snap, or a combination thereof.

The second design feature is a frame 11 and liner 20 configured such that the distance 24 between the foot face 16a and the opposing liner surface 23 is slightly longer than the associated dimension of the mobile device 200. Preferably, the length 24 is between 5-40 thousandths of an inch longer than the longest dimension of the mobile device 200 for which the case 100 was designed.

The benefit of the foot 16 is better understood by reviewing the mobile device 200 installation process. During the mobile device 200 installation, it is first pushed into the top of the case 100 and under the top inside lip 22. Next the bottom part of the mobile device 200 is pushed into the frame 11 past the bottom inner liner lip 22a. During insertion the bottom inner lip 22a needs to flex down as the mobile device 200 is pushed past the lip 22a, and flex back to a position overlying the mobile device 200 bottom end. Given that the foot 16 extends beyond the liner front surface 20a, the foot 16 forms a low friction surface for the mobile device 200 bottom end to slide over during insertion. Thus, the inside liner inside surface 20a does not bind with the mobile device 200 or the liner 20 and the outer liner lip 21 is not pulled away from the frame 11.

Further, the foot 16 provides another unobvious benefit for the mobile device 200 insertion process. When the insertion process is reversed with the mobile device 200 first being slipped under the end of the chassis 10 with the foot, the foot helps in an additional way. When the end of the mobile device adjacent to the foot 16 is first slipped into the case 100 and under the inner liner lip 22a, the foot 16 concentrates a component of the insertion force to the area of the frame 11 where the foot 16 is located. If the foot 16 is centered along a frame 11 side, then this component of the insertion force bends the frame outwards. While the chassis 10 is substantially inelastic, the foot 16 and the area of the frame 16 behind the foot 16 can bend out several tenths of an inch. This enables the mobile device, during insertion, to flex back away from the top liner lip 22, slip under it, and then be pushed up into position under the lip 22 by the foot when the frame 11 flexes back into position. Without the foot 16, a component of the insertion force would be at the corners of the frame resulting in a tension force along the frame. Given the frame 16 is inelastic, the frame 16 would not stretch enough to for the mobile device 200 to move back and under the top inner lip 22. Thus, without the foot, the insertion process would be much more difficult or impossible without damaging the liner 20.

Additionally, the foot width 19 cannot be too long. As the foot 16 becomes wider, more of the insertion force is moved towards the frame 11 corners. Thus, the greater the foot width 19, the more frame 11 tension and less fame 11 flexing. Thus, the foot 16 width should be limited to less than thirty percent of the length of the frame 11 side to which the foot 16 is attached.

The third structural feature is the limited width 26 of the bottom inner lip 22a. If the inner lip 22a is too wide, excessive leverage is created on the bond between the outer liner lip 21 and the frame 11 during insertions. This can result in the liner 20 being pulled down and away from the frame 11. Accordingly, the bottom inner lip width 26 needs to be limited. Additionally, the lower liner lip 22a needs to be sufficiently wide 26 to extend over the top surface of the mobile device 200. Given that the inside distance 24 is greater than the mobile device length and the offset created by the foot 16, the bottom lip width 22a needs to be wider than the top lip 22 width to assure overlap of the mobile device 200 bottom edge. Preferably, the width 26 of the bottom lip 22a is no more than 20-45 thousandths of an inch greater than the top or side inner lips 22 and not more than 200 thousandths of an inch in total. Otherwise the asymmetry between the bottom inner lip 22a and the top or side inner lips 22 will become visually apparent, and there will be excessive leveraging forces on the outer lip 21 during installation.

Hollow-Core Door

Referring to FIG. 1 and FIG. 2, a hollow-core door 30 is shown and described below. The hollow-core door 30 is structured with a front side 31, a back side 32, a first and second side 33a, 33b, and a bottom 34 forming a substantially rectangular storage compartment 36. One means of access to the storage compartment 36 is through a content access aperture 37 defined by the front 31, the back 32, and the first and second side 33a, 33b. The sides 33a, 33b, back 32 and bottom 34 are generally configured to blend in with the chassis 10 so that the presence of the hollow-core door 30 is not obvious. Thus, the shape of the door sides 33a, 33b, back 32 and bottom 34 can be rounded or curved in any particular manner.

Preferably the door sides 31, 32, 33a, 33b, and bottom 34 are integrally formed together. Further, the door 30 can be configured to receive a hinge structure 40 for coupling the door 30 to the chassis 10 and configured with one or more latch structures 50 to secure the door 30 to the chassis 10, or frame 11. Additionally, the door and can include one or more bosses FIG. 4-45a, 45b to provide resistance to the door 30 opening and closing.

The door 30 can be formed from the same material as the chassis 10, a hard polycarbonate or ABS plastic. However, other materials are contemplated including but not limited to metal, carbon fiber, and wood. Preferably the sides 33a, 33b, bottom 34 and back 32 do not have apertures but embodiments with apertures are contemplated.

The door 30 storage compartment 36 is specifically designed to hold just enough items to be a complete wallet replacement. Experimentation has found that five cards can provide a complete wallet replacement and forces an owner to eliminate unneeded items from their wallet. To state, the case's 100 capacity is only the thickness of 5 credit cards is understating the true capacity of the case because the average credit card also has raised brail-like numbers which significantly adds to the thickness. If the credit cards are stored face to face, additional capacity is provided. As an example, the case typically carries a total of 10 cards. These include a standard credit card, an ATM/Debit card, a driver's license, a cash bill folded in thirds, and 6 standard size business cards. Other contents that can be held in the door 30 include but are not limited to business cards, credit cards, cash or currency, coins, keys, or a combination thereof.

The storage compartment 36 is designed with two significant structural features. First, the storage compartment 36 is sized to hold both business cards and credit cards. Further, the design is limited to hold the maximum thickness of five credit cards, sufficient for a complete wallet replacement, while eliminating storage of unnecessary items.

Secondly, the storage compartment 36 is formed to be slightly wider than a standard credit card and longer than a business card. Business cards are usually longer than credit cards. A slightly longer and/or wider storage compartment provides the feature that the cards will rattle around if the storage compartment 36 is not full. This rattling of the cards can serve as a reminder that a card is missing. If a credit card is not returned to the storage compartment 36 after use, or that the storage compartment 36 needs a refill of additional business cards, the rattling of the other cards serves as an audible reminder.

Preferably, the storage compartment 36 holds a maximum of 5 credit cards or a combination of business and credit cards. Preferably, the storage compartment 36 thickness is between 0.185 to 0.205 inches. Optimally, the compartment 36 is the thickness of 5 credit cards, 0.192 inches. The size of a standard credit card is 3⅜×2⅛ in (85.60 by 53.98 mm) when conforming to the ISO/IEC 7810 ID-1 standard. Accordingly, the storage compartment 36 length is no less than 3.530 inches and a width of no less than 2.160 inches. In the preferred embodiment, the door is no wider than the frame width.

Door Capsule Aperture

The door front side 31 can include a thumb slider aperture 38. When the door 30 is closed and the mobile device 200 installed, any credit cards in the door storage compartment 36 are hidden from external viewing. When the door 30 is open, the thumb slider aperture 38 provides finger access to slide a credit or business cards out the content access aperture 37. The next card can be viewed through the thumb slider aperture 38 as the other stored cards are slid out of the way. Further, the thumb slider aperture 38 should be sized to so that a single thumb motion will reveal a substantial part of the next card. A thumb slider aperture 38 length between 40% and 60% of the length of a business card is preferable.

Preferably, the thumb slider aperture 38 is capsule shape, but other shapes are contemplated. In other embodiments the thumb slider aperture 38 can be rectangular, round or an irregular shape.

The thumb slider aperture 38 is also configured to provide quick insertion of one or more keys into the door storage compartment 36. By providing a thumb slider aperture 38 sized for easy key insertion, the potential of damage to a business card is reduced. Key insertion through the thumb slider aperture 38 help assures that a key is on the top of the business cards and not between business cards.

Once a key is inserted, it can be slide over to one of the sides of the door compartment 36. A large door key is a little over one inch wide and over 2.25 inches long. Experimentation has found that a thumb slider aperture 38 having between 70% to 100% of a key width and length provides easy insertion of a key. An aperture 38 of between 0.875 to 1.25 inches wide and 2.0 to 2.50 inches long is preferred.

Door Stand

Figure 7A:
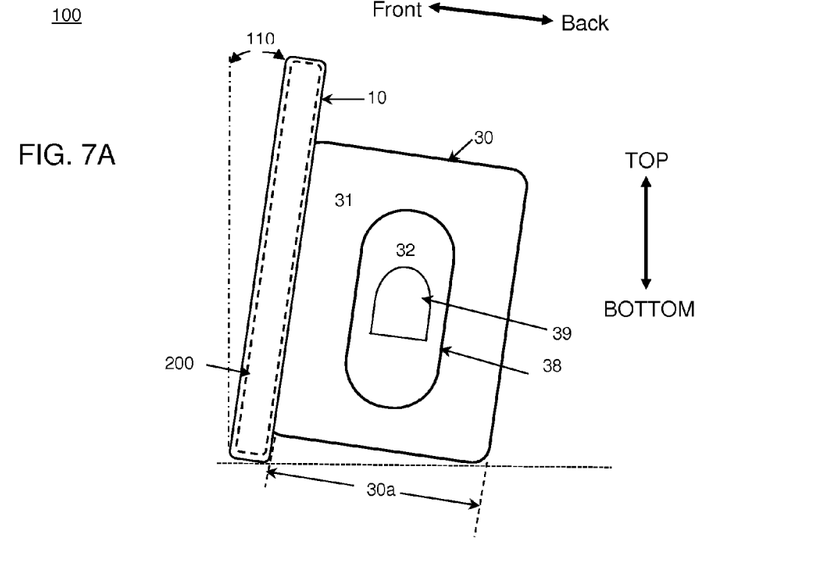
FIG. 7A—A side view of the case in portrait mode.
Figure 7B:
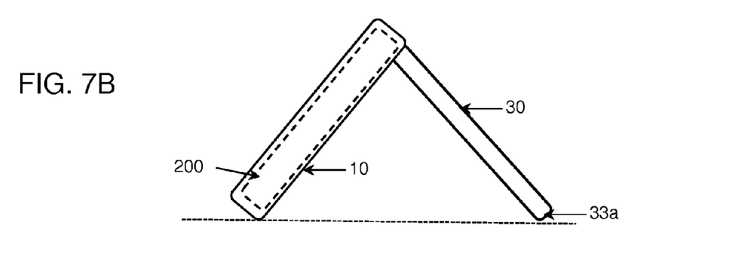

As shown in FIGS. 7A and 7B, the door 30, when open, functions as a stand for both a mobile device 200 in a vertical (portrait) position and horizontal (landscape) position. The structures providing stand functionality includes the door 30, the chassis 10, the bosses FIG. 4-45a, 45b, and the lower transverse structure 13.

As shown in FIG. 7A, in the vertical position, the door offset 18 along the frame 11 and door width 30a determine the inclination 110 of the mobile device 200. Preferably, the door width 30a and the door offset 18 are selected to provide a vertical (portrait) case inclination 110 between 7-20 degrees when the door 30 is open 90 degrees from the closed position. Further, the preferred location of the hinges is on the side that the mobile device has its volume buttons. Thus, when the mobile device 200 is sitting in portrait position, the volume buttons are easily accessible without picking up the case 100.

The bosses FIG. 4-45a, 45b on the top and bottom ends of the door 30 provide friction between the door 30 and the top and bottom transverse structures 12, 13. The friction between the bosses 45a, 45b and the top and bottom transverse structures 12, 13 holds the door 30 in position when open. Preferably the bosses 45a, 45b are located at, around, or near the hinge 30 so that resistance to door movement is provided throughout the full range of door motion. Preferably, the bosses 45a, 45b are an integral structure comprised of the same hard material from which the chassis 10 and door 30 is formed. Preferably, there is sufficient boss friction to hold the door open when the case 100 is configured with a mobile device weighing up to 8 ounces and standing in the landscape position on a low friction surface with the door 30 open ninety degrees. While the shown embodiment in FIG. 4 has the bosses 45a, 45b on the door, the bosses 45a, 45b can be formed as part the top and bottom traverse structures 12, 13.

Door Latch

Figure 5:
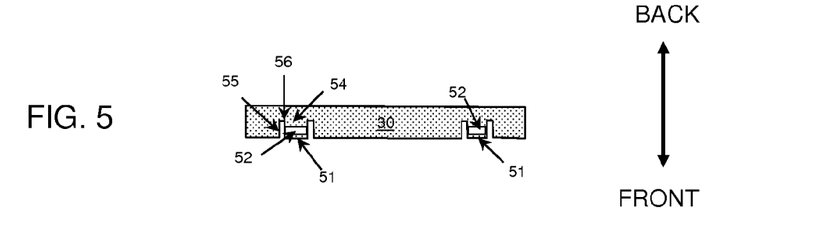
FIG. 5—A side view of the hollow-core door.

Referring to FIG. 5, a side view of the hollow-core door 30 shows two teeth 51 formed into the hollow-core door side 33a. The teeth 51 are preferably integrally formed as part of the door 30 and located substantially at the ends of the door 30. The figure shows the female receiving recess 52 formed into the tooth 51 that is configured to receive a cleat 53.

Figure 6A:
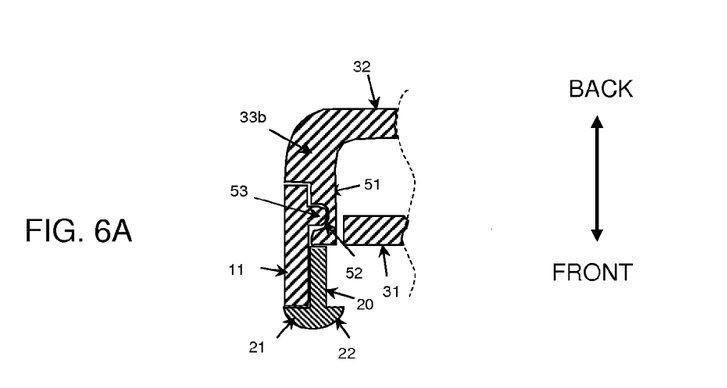
FIG. 6A—A sectional view of the latch including the door and frame with the tooth engaged with the cleat.
Figure 6B:
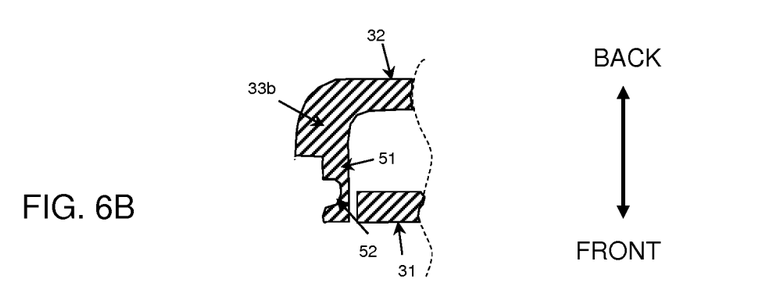
Figure 6C:
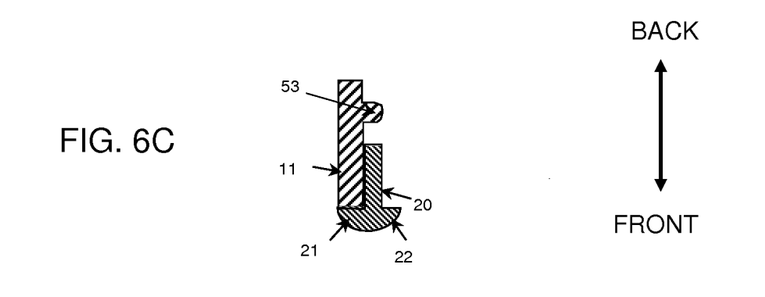

Referring to FIG. 6A, a cross section of the latch structure 50 is shown and described below. FIG. 6B shows a cross section of just the tooth 51 in the door 30. FIG. 6C shows a cross section of the frame through the cleat 53.

In the shown latch structure 50, the latch is comprised of two elements. One element is integrally formed as part of the door 30 and the other element is formed as part of the chassis 10 or frame 11. In the shown embodiment, the latch structure 50 includes an integrally formed tooth 51 coupled to the door side 33a and a cleat 53 coupled with the frame 11.

The cleat 53 can include or be formed as any shaped male protuberance. The cleat 53 is preferably formed substantially transverse from the frame 11 inside surface or chassis 10. Exemplar of other cleat 53 shapes contemplated includes a round, spherical, square, rectangular, or irregularly shaped cleat 53. Preferably, the male protuberance does not extend more than 150 thousandths of an inch from the inner frame surface 11b.

The door 30 is formed with the tooth 51 that is coupled with the door 30 on only one end 54. Preferably, the tooth 51 is coupled to the door side 33a and is not attached to the door front 31 or back 32. However, a configuration with the tooth 51 coupled to the door back 32 is contemplated. The tooth 51 sides are separated from the door side 33a by a notch 55 formed into the door 30. As shown in FIG. 5 the top of the notch 56 is formed with ninety degree angles. However, these sharp angled corners can create stress points leading to the formation of cracks in the polycarbonates. A preferred embodiment has rounded corners or and arch at the top of the notch and thereby eliminating stress points.

Preferably, the tooth 51 is formed to be substantially parallel with the door side 33a. Further, the tooth 51 being coupled to the door side 33a enables the tooth 51 to flex when engaging the cleat 53 during door closure. In the shown embodiment, the tooth 51 is rectangular but in other embodiments the tooth 51 can be round or another shape. One skilled in the art of injection molding would be able to select a tooth 51 coupling means that provides the desired resistance latching and unlatching the door 30.

Further, the tooth 51 is configured with a female receiving recess 52 that is configured to receive or engage the cleat 53. The receiving recess 52 can be shaped as a concaved area, a concaved groove, a notch, or a channel. Preferably the female receiving recess 52 substantially conforms to the shape of the cleat protuberance 53. However, other shapes for the female receiving recess are contemplated.

The tooth 51 is made from a material that provides resistance to flexing as the cleat 53 presses against and engages the female receiving recess 52 as the door 30 is closed. Preferably, the tooth 51 and female receiving recess 52 are integrally formed as part of and from the same material as the door 30. Further, preferably the cleat 53 is integrally formed with the frame 11 and protrudes transversely from the frame 11.

Preferable the latches 50 are on the side of the door 30 opposing the hinges 40 and along the door's side 33a. However, in other embodiments, the latches can be located on the on the door bottom 34. Two latches 50 are preferable but an embodiment with a single latch 50 is contemplated. The benefit of a case 100 with two latches 50 is that the door 50 is less likely to spring open when the frame 11 is twisted or stressed such as during a case 100 drop. Further, if the frame 11 structure ever bows outward, a single latch 50 centered on the door 30 could fail. By having dual latches 50 positioned near the top and bottom of the door 30, the latches 50 are much more likely to counteract any frame 11 bowing or twisting.

Other latching structures are contemplated. These can include a pressure fit between the door 30 and the frame 11. In another embodiment, the door 30 can be held closed by pressure points between the door 30 and top and bottom transverse structures 12, 13.

Door Hinges

Figure 4:
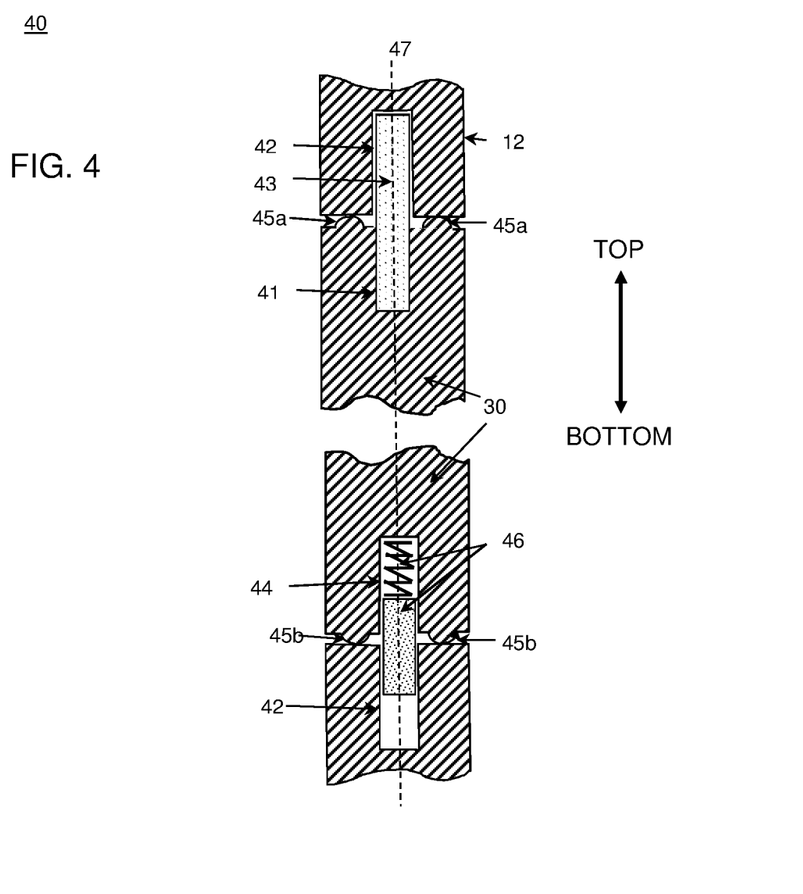
FIG. 4—A sectional view of the hinge.

Referring to FIG. 1 and FIG. 4, the door's hinge structure 40 is located at top and bottom of the door second side 33b. However, the hinges 40 in another embodiment can be located along the bottom of the door 30 opposite the content access aperture 37 or on the opposing side of the door 33a. In the embodiment shown in FIG. 4, the door 30 includes a hole or other recess shape 41, 44, running in the axis of door rotation 47 and configured to accept hinge pins 43, 46. As shown in FIG. 4, the door is shown with a spring loaded hinge pin 46 on the bottom end of the door and a straight pin 43 at the top of the door. The recess or hole 41 at the top of the door can be a different size than the recess or hole 44 at the bottom of the door.

The bottom hinge pin 46 can be spring loaded on one or both ends. As shown in FIG. 4, the preferred embodiment includes a hinge pin 46 that is spring loaded on only one end. In other embodiments, the spring loaded pin can be seated into either the door 30 or the top and bottom transverse structures 12, 13.

As shown in FIG. 4, the one end of the pin 43 can be secured in the door recess 41 by a friction fit. Alternatively, the pin 43 can be secured in the top transverse structures 12. The other end of the pin can rotate freely in the door recessed hole 41.

Other means of securing one end of the pin 43 to either the door 30 or transverse structures 12, 13 are contemplated including but not limited to glue and clips.

Spring Card Holder

In another embodiment, the door 30 includes a thin spring plate (not shown) that is placed in the storage compartment 36 which is bent and at an angle or curved. This allows a single card to be put into wallet compartment, and the spring can hold the card(s) in place, without allowing it to rattle.

Tactile Liner Buttons

The frame 11 can include one or more frame apertures 11a that can overlie a one or more mobile device 200 control buttons. These include but are not limited to a pair of volume control buttons. The liner 20 can extend through these frame apertures 11a and extend beyond the outside plane of the frame 11 and thereby form tactile buttons 25a, 25b. Preferably, a tactile liner buttons 25a, 25b are integrally formed with the liner 20 and provides mobile device protection from liquids, moisture, dust, and dirt. The tactile liner buttons 25a, 25b can be shaped to provide user feedback on which mobile device 200 button is being asserted.

By the liner 20 being both flexible and compressible, when the tactile liner button 25b is compresses, it flexes sufficiently to push the overlying mobile device 200 button. Further the tactile button 25b compresses and flexes sufficiently that adjacent mobile device 200 button is not also asserted.

Additionally, the tactile liner button 25b can be formed to provide tactile feedback of which button is being pressed. Exemplar of a tactile button is rocker shaped button 25b located over a pair of mobile device 200 volume buttons.

The addition of tactile feedback by shaped tactile volume buttons benefits the user because the shape gives the user of the mobile device 200 an indication of whether an up, or down volume button is being asserted. In one embodiment of the invention for the iPhone 4/4s and iPhone 5, the up and down volume buttons are separate and difficult to differentiate by touch. Each TPE or TPU liner tactile button 25a, 25b can be shaped differently to give user a tactile feedback on which button is being asserted.

Further, the size of the tactile button can be larger than the mobile device buttons while still reliably communicating user inputs to the mobile device buttons. Thus, such a design can simulate a rocking toggle switch.

Mute Switch

The case 100 can include a structure for controlling slide switches which are configured with a raised switch surface. The structure includes an aperture in the chassis positioned adjacent to the mobile device slide switch. Often, the slide switch is used for a muting function. The chassis includes a tab behind the aperture and below the aperture, along with twin registration cleats. The tab is configured to hold a mute button slider in place. The mute button slider has a channel configured to receive a mobile device slider switch such as a mute button slide switch.

Preferably, the mute button slider has a tight fit against the chassis providing a resistance to water reaching the mobile device. The rear side (opposite where a user would touch) of the mute button slider has ramped surfaces above and below the channel. The ramps are configured to allow the mute button slider to slide over the mobile device slide switch until the channel drops over the protruding mobile device's slide switch. This design automatically catches or grabs the mobile device mute switch allowing the mobile device to be installed into the case with the mute button slider being in any position and auto-find and couple to the mobile device slider switch.

Case Texturing

The chassis 10 backside, as well as the rear of the hollow-core door 30 can be treated with soft-touch paint that provides an anti-slip and anti-scratch finish. The frame 11 can be finished with a micro bead-blast finish, which gives the surface a matte finish that cuts down on light reflection and hides fingerprints and scratches. The advanced ergonomic design of the case 100 exterior also significantly contributes to the anti-slip nature of the design. Specifically, the entire outside of the case lacks any right angles. Instead, the whole case is convexed. Curving and convexing the case makes it much easier to hold in your hand, much in the same way that a baseball bat is much easier to grip than a deck of playing cards.

Lanyard

The chassis 10 can be configured receive a standard loop lanyard. In another embodiment, the chassis includes a protrusion on the outside of the case 10 with one or more apertures to attach the lanyard. The lanyard can be secured by looping a tether through the two chassis apertures. The chassis apertures can be located on the top, side, or bottom of the chassis 10. However, other lanyard securing means are contemplated including but not limited to a single aperture with a bar bisecting the aperture.

Quick Disconnect System

Figure 8:
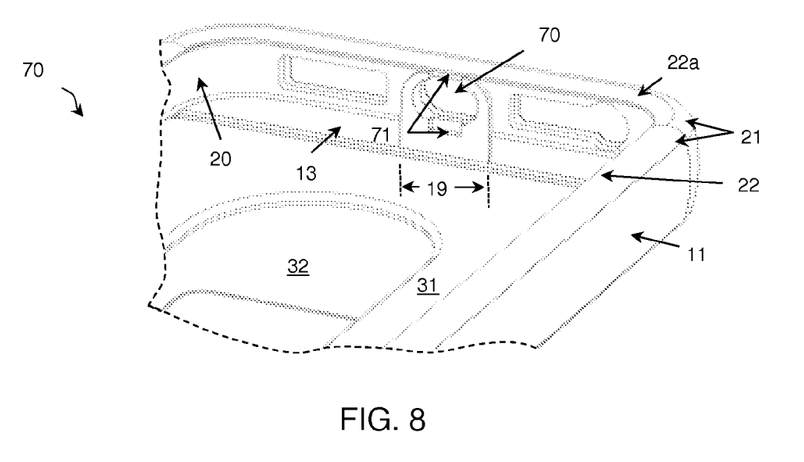
FIG. 8—A perspective view of the end of the case configured with a quick disconnect system.

The frame 11 or chassis 10 can be configured with a quick disconnect system. Referring to FIG. 8, one embodiment of the quick disconnect system is shown integrated with the case 100A. In the shown embodiment, the foot 16 is configured with a quick disconnect aperture 70. This aperture 70 can provide other functions such as access to a power connector or other mobile device 200 connectors.

Within the aperture 70 there are two counter-sinks 71 configured to receive two fingers that securely engage the two counter sinks 71. The two fingers (not shown) are integrated into a quick disconnect plug (not shown) that is inserted into the aperture 70. The plug is configured to have a first position with the fingers positioned without the fingers touching the walls of the quick disconnect aperture 70. In a second position the fingers are securely engaged with the two counter-sinks 71.

While the aperture 70 is shown as part of the foot 16, it can be located in other locations along the frame 11 or chassis 10. Further, the counter sinks 71 do not have to be located in an aperture. In other embodiments, a cavity can be formed in the frame 11, the top or bottom transverse structures 12, 13, or the door 30 and the counter-sinks 71 located within a cavity or aperture therein.

What is claimed:

1. A wallet case apparatus comprising:
   a hollow-core door comprising a front side, a back side, a bottom, a first side and a second side defining a storage compartment, wherein the front, the back, the first side and the second side define a rectangular content access aperture, and wherein the front side is configured with a thumb slider aperture to the storage compartment, wherein the front, the back, and the first side and second side are configured so that the storage compartment is no less than 3.530 inches long, no less than 2.160 inches wide, and between 0.185 and 0.205 inches thick, wherein the thumb slider aperture is shaped with two substantially parallel sides joined on each end by a convex arc, wherein the parallel sides are oriented in the long direction of the hollow-core door, wherein the thumb aperture has a width between 0.875 inches and 1.25 inches and a length between 2.0 inches and 2.50 inches.

2. The apparatus of claim 1, further comprising:
   a continuous inelastic frame shaped to circumscribe the perimeter of a mobile device wherein the frame has a frame side and a frame side length;
   an elastomeric liner coupled to the frame inside having a liner thickness; and
   a foot configured on the frame inside, wherein the foot extends transversely from the inside of the frame greater than the liner thickness, and wherein the foot has a foot width parallel to the frame side.

3. The apparatus of claim 2 further comprising:
   a top transverse structure;
   a bottom transverse structure; and
   a hinge structure, wherein the front side is adjacent to the frame when the hollow-core door is close, wherein the hinge couples the hollow-core door to the top transverse structure and bottom transverse structure and wherein the hinge is located on one side of the door.

4. The apparatus of claim 3 further comprising a liner button, wherein the frame has one or more button apertures, wherein the button apertures are configured to overlie one or more mobile device buttons, and wherein the liner is integrally formed with one or more liner buttons that extend through the one or more button apertures, and wherein the liner button is configured to communicate an external force to the one or more mobile device buttons.

5. The apparatus of claim 4 wherein one button of the one or more liner buttons overlie a pair of mobile device volume buttons, wherein the one button is configured to assert one of the volume buttons when a force is placed on a first part of the one button and to assert the other volume button when pressed on a second part of the one button, and wherein the one button is shaped to provide tactile feedback on the which is the first part and which is the second part.

6. The apparatus of claim 5 wherein the liner and one or more liner buttons are integrally formed, wherein the liner is formed from Thermoplastic Elastomer or Thermoplastic PolyUrethane, wherein the frame, the top transverse structure, the bottom transverse structure, and the foot are integrally formed from polycarbonate or Acrylonitrile Butadiene Styrene plastic.

7. The apparatus of claim 6 wherein the top transverse structure is shaped with a hollow recess that is hidden when the device is configured with a mobile device.

8. The apparatus of claim 6 further including one or more bosses, wherein the one or more bosses are located around the axis of the hinge structure, wherein the one or more bosses provide sufficient friction between the door and the top transverse structure, the bottom transverse structure, or both to hold the door in position when the device is configured with a mobile device and positioned as a landscape stand.

9. The apparatus of claim 8 wherein the mobile device weighs up to 8ounces.

10. The apparatus of claim 9 wherein the foot is substantially centered at the bottom end of the frame, wherein the mobile device has a mobile device length, and wherein the distance from the foot face and the opposing liner surface is 5 to 40 thousandths of an inch longer than the mobile device length.

11. The apparatus of claim 10 further comprising an outer lip and inner lip integrally formed with the liner, wherein the outer lip circumscribes and covers the front frame edge, and wherein the inner lip is 10 to 30 thousandths of an inch wider along the bottom than the width of the inner lip at the top.

12. The apparatus of claim 11 wherein the height of the bottom transverse structure and the door width is configured to have the case sit at an incline of between two and twenty degrees when the door is open ninety degrees and sitting in a portrait position.

13. The apparatus of claim 9 further comprising a first latch structure comprising a cleat integrally formed on the frame inside and a tooth integrally formed in the hollow-core door side, wherein the cleat forms a male protuberance substantially transverse to the frame, and wherein the tooth includes a female receiving recess configured to receive the male protuberance when the hollow-core door is closed.

14. The apparatus of claim 13 further comprising a second latch structure, wherein the first latch structure is positioned along the upper quarter of the hollow-core door and the second latch is configured along the bottom quarter of the hollow core door.

15. The apparatus of claim 4, wherein the frame is configured with a quick disconnect aperture and wherein the quick disconnect aperture is configured with two recesses configured to engage fingers of a quick disconnect plug.

16. The apparatus of claim 10, wherein the foot width is less than 30 percent of the frame side length_to which the foot is coupled.

17. The apparatus of claim 15 wherein the quick disconnect aperture extends through the foot.

18. A wallet case comprising:
a continuous inelastic substantially in the shape of a mobile device having a mobile device length, a mobile device width, and having one or more button apertures;
a top transverse structure integrally formed with the frame, extending across a top end of the frame, having an first hinge aperture configured to receive a hinge pin and having a first storage cavity;
a bottom transverse structure integrally formed with the frame extending across the bottom end of the frame wherein the bottom transverse structure is configured to receive a hinge pin;
a hollow-core door having a storage cavity with a long dimension of no less than 3.53 inches and no more than the mobile device length, a width of no less than 2.16 inches and no more than the mobile device width, and a thickness of between 0.185 and 0.205 inches, wherein the hollow core door has an opening at the top of the door to the storage cavity, wherein the door has a thumb slider aperture with two substantially parallel sides joined on each end by a convex arc substantially centered on the inside of the door with a length of between 2.0 inches and 2.50 inches, a width between 0.875 and 1.25 inches, and the door is configured to receive a hinge pin;
a top boss and bottom boss integrally formed into the hollow-core door top and hollow-core door bottom and configure to provide friction between the top boss and the top traverse structure and the bottom boss and bottom traverse structure, wherein each boss is centered around the top and bottom hinge aperture, wherein the bosses are configured to provide friction through at least ninety degrees of door motion;
a cleat integrally formed on the side of the door opposing the hinge, wherein the cleat includes a concave receiving notch, wherein the cleat is formed on the door side opposing the hinge;
a tooth integrally formed on the inside of the fame positioned to engage the concave receiving notch when the door is closed, wherein the frame, the top transverse structure, the bottom transverse structure, the door, the two bosses, the cleat, and the tooth is formed out of polycarbonate or Acrylonitrile Butadiene Styrene plastic;
a liner formed from Thermoplastic Elastomer or Thermoplastic PolyUrethane material coupled to the inside of the frame having a liner thickness, and wherein the liner extends through the frame aperture and is configured to communicate pushing forces to a mobile device, wherein the liner includes an inside lip covering the front edge of the frame and an inside lip extending transversely from the top edge of the frame, and wherein the bottom inside lip extends 0.030 of an inch farther than the top inside lip; and
a foot integrally formed on the inside bottom of the frame wherein the foot extends transversely from the frame inside and extends beyond the inside liner surface.

* * * * *